(No Model.) 2 Sheets—Sheet 1.

B. M. ROOT.
MACHINE FOR MIXING OR BLENDING FLOURS.

No. 557,892. Patented Apr. 7, 1896.

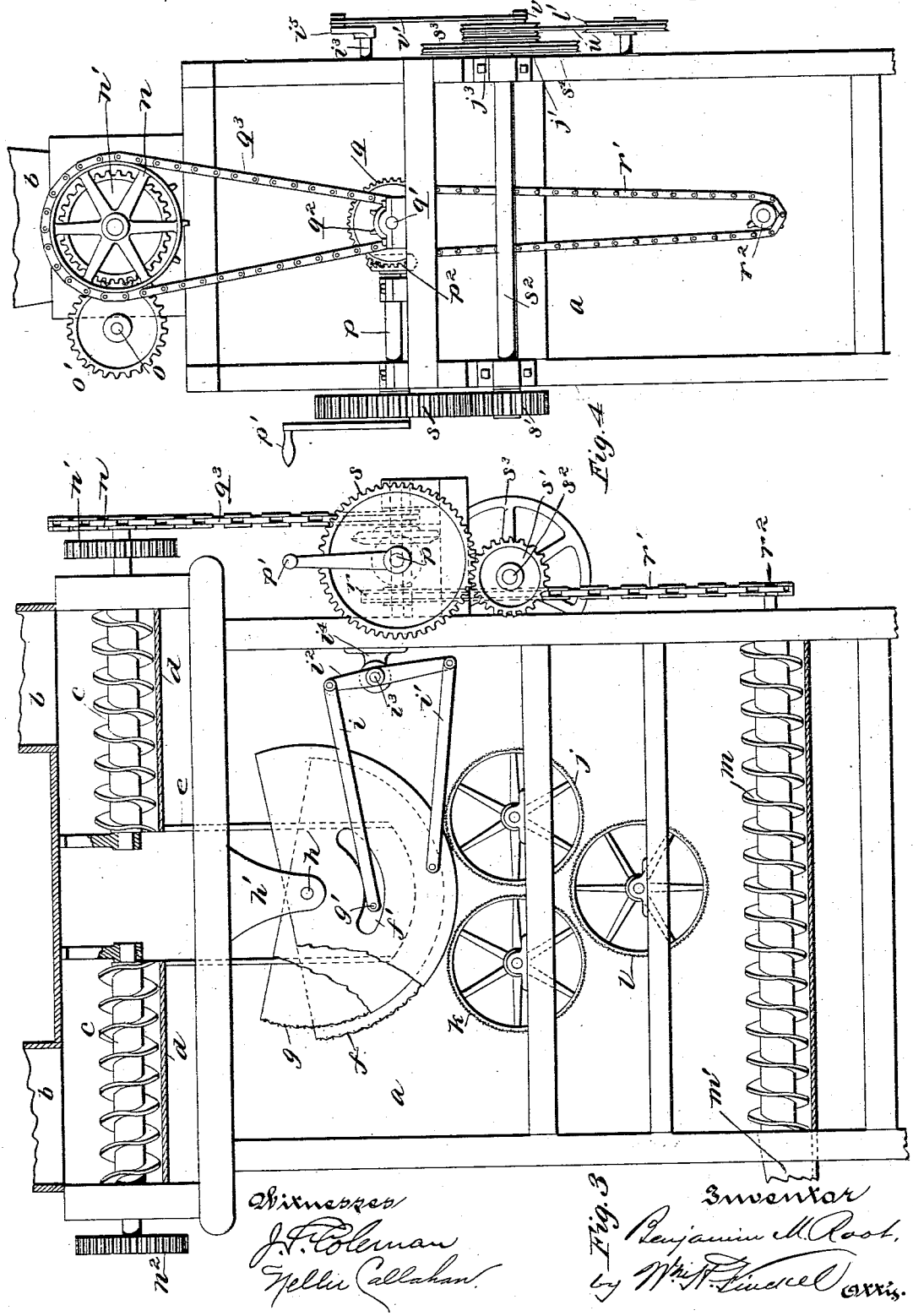

UNITED STATES PATENT OFFICE.

BENJAMIN M. ROOT, OF YORK, PENNSYLVANIA.

MACHINE FOR MIXING OR BLENDING FLOURS.

SPECIFICATION forming part of Letters Patent No. 557,892, dated April 7, 1896.

Application filed December 7, 1895. Serial No. 571,380. (No model.)

*To all whom it may concern:*

Be it known that I, BENJAMIN M. ROOT, a citizen of the United States, residing at York, in the county of York and State of Pennsylvania, have invented a certain new and useful Improvement in Machines for Mixing or Blending Flours, of which the following is a full, clear, and exact description.

It is a common practice among dealers in flour and among bakers to mix or blend various grades, kinds, or qualities of flour—as, for example, flours made from spring and from winter wheat—with the object of neutralizing the excessive moisture of one kind of flour by the equally excessive dryness of another kind of flour. The beneficial results obtained by blending flours, in the matter of facilitating the making of dough and in the baked product, are well known.

Machines have been devised for mixing or blending flours, and it is recognized also as important that the admixture of the various grades, kinds, or qualities of flour should be as intimate and uniform as possible to secure the best results—that is to say, the more "lively" the flour can be made the better.

The object of my invention is to provide a machine as free from complexity in its mechanism and operation as may be possible, and yet adapted to act positively upon the flour to insure its thorough admixture or blending.

In carrying out my invention I employ a number—two or more—of feeding devices, which will conduct the flour in an agitated state to a chute common to all, whence it descends into sieves, and from which latter it is projected upon agitators, and from these agitators it descends to a discharging device, all as I will proceed now more particularly to set forth and finally claim.

Figure 1:
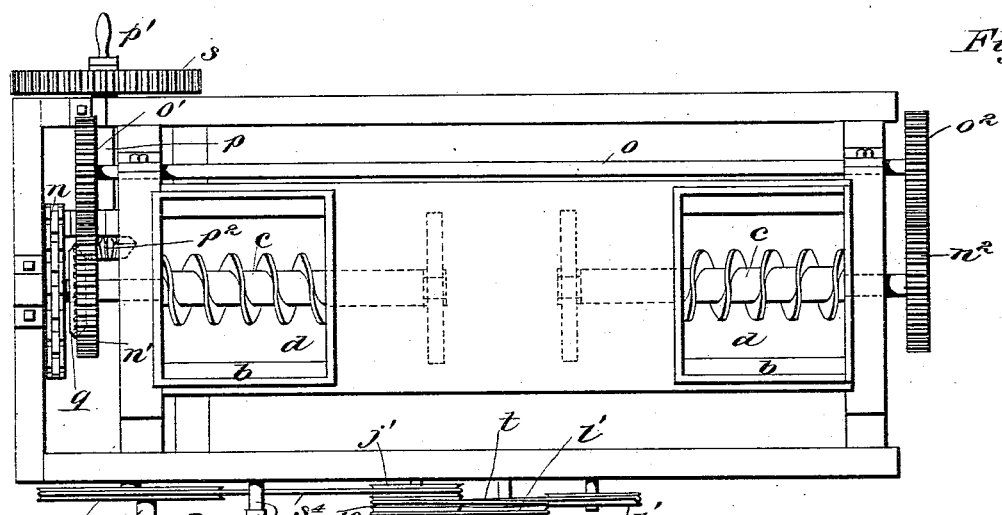
Figure 2:
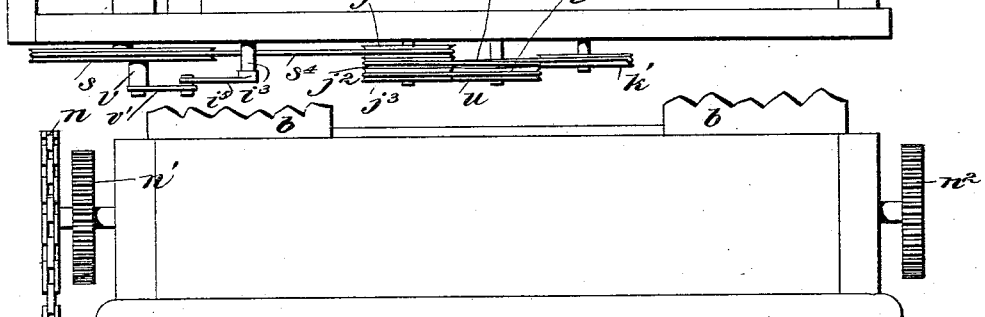
Figure 2:
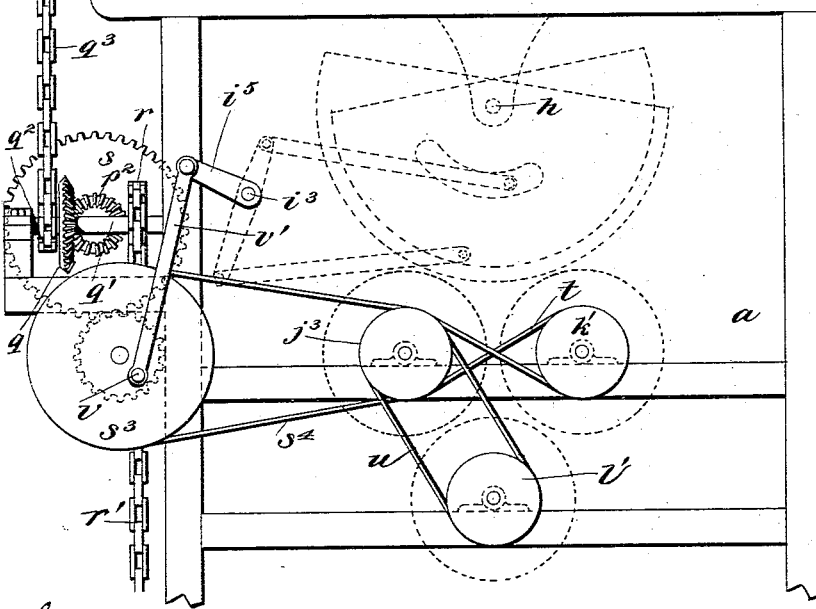

In the accompanying drawings, illustrating my invention, in the several figures of which like parts are similarly designated, Figure 1 is a top plan view. Fig. 2 is a side elevation, omitting the discharging device and parts of the inlets. Fig. 3 is a sectional elevation looking at the opposite side of the machine from that shown in Fig. 2, and Fig. 4 is an end elevation.

The casing $a$ may be of any approved dust-tight construction, and is provided at its upper portion with as many funnels or hoppers $b$ as there are grades, kinds, or qualities of flour to be mixed. Below each of these funnels or hoppers are arranged an equal number of feeding devices, such as screw conveyers $c$, in suitable troughs $d$, and all of these screw conveyers are arranged to feed or discharge the flour into a common chute or discharge-spout $e$. This chute or discharge-spout opens into a sieve, and in the preferred construction of sieve I employ two cylindrical segments $f\ g$, arranged one within the other and suspended upon pivots $h$, common to both, from hangers $h'$ and vibrated in opposition by means of arms $i\ i'$, which are mounted upon a rocker-arm $i^2$, which in turn is made fast to a rock-shaft $i^3$. This rock-shaft is supported in brackets $i^4$, secured to the casing. The arm $i$ is pivoted to the inner sieve $g$ by means of a pivot $g'$, which travels in a slot $f'$ in the side of the sieve $f$.

Beneath the sieves are arranged a series of cylindrical agitators $j\ k\ l$, each of which may be of the same diameter and constructed with a periphery of wire or other suitable net mounted upon suitable heads and internal supports, as indicated in Fig. 3. I prefer to arrange two of these agitators in the same plane and immediately below the sieves and to turn them in opposite directions, and the third agitator $l$ is arranged immediately beneath these first-named agitators and in the line of their closest touch. The sieves may be arranged lengthwise of the casing and of the screw conveyers, while the agitators are arranged at right angles thereto. Below the agitators I arrange a discharge device, herein shown as a screw conveyer $m$, having an outlet at $m'$. These various elements of my machine may be operated by hand or by power, according as the machine is designed for domestic or commercial purposes. In the drawings I have shown the machine as equipped for hand-power. The conveyers $c$ are mounted upon independent shafts, and upon one of these shafts are fixed a sprocket-wheel or band-pulley $n$ and a toothed wheel $n'$. Upon the shaft of the other conveyer $c$ is fixed a toothed wheel $n^2$. At one side of the machine is arranged a shaft $o$, upon opposite ends of which are secured the toothed wheels or pinions $o'\ o^2$, which respectively mesh with the toothed wheels $n'$ and $n^2$ on the conveyer-shafts, so as to transmit motion to the two conveyers. The main shaft may be a short shaft $p$, mounted at one end of the casing, and, as herein shown, this main shaft is provided with a hand-crank $p'$; but for this hand-crank may be substituted any suitable power appliance. The shaft $p$ is provided with a bevel-pinion $p^2$, which meshes with the pinion $q$ on a short shaft $q'$, suitably mounted on the casing. This short shaft $q'$ is provided with a sprocket or band wheel $q^2$, from which a sprocket-chain or a band $q^3$ extends to the sprocket or band wheel $n$ on the screw-conveyer shaft. The shaft $q'$ has applied to it also a sprocket or band wheel $r$, (see Fig. 2,) from which power is transmitted through the sprocket-chain or a band $r'$ to a sprocket-wheel or band-pulley $r^2$ on the shaft of the discharge-conveyer $m$.

The main shaft $p$ has upon it a toothed wheel $s$, which meshes with a pinion $s'$ on a shaft $s^2$, which is mounted at one end of the casing, and at its other end the shaft $s^2$ is provided with a band-pulley or sprocket-wheel $s^3$, from which a band or a sprocket-chain $s^4$ extends to a pulley or sprocket-wheel $j'$ on the shaft of the agitator $j$. This shaft of the agitator $j$ is provided also with two additional pulleys, (see Figs. 1 and 4,) and from one of these pulleys or band-wheels, as $j^2$, Fig. 1, a crossed belt $t$, Fig. 2, extends to a band-pulley $k'$ on the shaft of the agitator $k$, and from the other of these band-pulleys $j^3$ a straight belt $u$ extends to a band-pulley $l'$ on the shaft of the agitator $l$. By this arrangement of belts and pulleys it will be observed that the several agitators have a surface speed equal to the speed of the main shaft, and that the two agitators which are arranged in the same plane turn in opposite directions—that is to say, toward one another.

The band-pulley $s^3$ may be provided with an eccentric wrist-pin $v$, from which extends a connecting-rod $v'$, which is joined to a crank $i^5$ on the rock-shaft $i^3$ to vibrate or rock the latter.

While I have thus described in detail a convenient and simple power mechanism for operating the various parts of my machine, I do not wish to be understood as limiting my invention thereto, since, as is obvious, other mechanism may be employed for rotating the feed-screws, the discharge-screw, and the agitators and for vibrating the sieves. I do, however, esteem it of importance that these parts should have the respective movements hereinbefore ascribed to them.

The machine shown in the drawings is adapted for mixing two kinds of flour; but it is obvious that a mere multiplication of feed-screws, all emptying into a common chute, will enable the machine to be used for mixing more than two kinds of flour, and in the event of the use of more than a single pair of feed-screws it will be well to provide for the throwing out of gear of those feed-screws which it is not desired to use at any given time. Thus a machine may be equipped with four feed-screws, so as to mix four kinds of flour, and if it be desired to mix only three kinds of flour then one of the screws may be thrown out of gear, and so also in a four-screw machine, if it be desired to mix only two kinds of flour then a pair of screws will be thrown out of gear.

I do not limit my invention to the use of screw conveyers for introducing the flour into the sieves and for discharging it from the machine, but prefer such conveyers.

The operation of the machine is as follows: The different grades, kinds, or qualities of flour having been introduced through the hoppers $b$ to the feeding devices $c$, the respective separated masses are subjected to the agitation of such feeding devices, and then are discharged and commingled in the chute $e$, whence they fall into the inner sieve, wherein they are agitated and further mixed, and from which they are discharged into the outer sieve, wherein they are subjected not only to the motion of the outer sieve but also to the motion of the inner sieve, thus further and intimately commingling them, and from the sieve the flour falls upon the agitators $j$ and $k$, (whose speed may be, say five hundred turns per minute,) whereby the flour is enlivened or aerated and further commingled, and since these agitators turn toward one another they tend to pass the flour between them and discharge it upon the agitator $l$, which gives a further movement to the flour in the process of blending, and finally the flour being caught by the discharge-screw $m$ is collected and discharged in a homogeneous blended condition. These agitators serve to mix the flour more thoroughly after it leaves the sieves, and, their speed being high, air-currents are produced which effect an aeration of the flour without heating it, and so leaving it in the best possible condition for baking purposes.

Prior to my invention brushes have been arranged in connection with sieves for agitating the flour, but with results that I deem unsatisfactory, and my experiments have demonstrated to my satisfaction that perfectly practical results, free from the objections encountered in the use of brushes, are obtained by the use of the oppositely-vibrating sieves in connection with the rotary cylindrical agitators having a perforated, foraminous, or reticulated periphery. Such last-named agitators, especially when driven at high speed, enliven the flour and are not clogged by it.

In mixing or blending the different grades, kinds, or qualities of flour it may be desirable to use more of one grade, kind, or quality than another in the mixture, and to accomplish this with my machine one or another of the feeding devices may be run faster than the others by the use of change-gears on the driving-shaft $o$ and feed-shaft.

What I claim is—

1. In a machine for mixing or blending flour, the combination of means for feeding individually the various grades, kinds or qualities of flour to a common primary commingling-receptacle, the said commingling-receptacle, a vibrating sieve, into which said commingling-receptacle discharges, a series of rotary foraminous agitators arranged below said sieve and receiving the flour discharged therefrom, and adapted to be driven at a high speed to commingle and aerate the flour and a discharge device, substantially as described.

2. In a machine for mixing or blending flour, the combination of means for receiving the individual grades, kinds, or qualities of flour to be commingled, a discharge-chute common to all of such devices, and into which they discharge, and in which the flour has an initial commingling, a pair of vibrating sieves, arranged one within the other and moving in opposition and receiving the commingled flour from the chute, a series of agitators arranged beneath the said sieves, and a discharge device, substantially as described.

3. In a machine for mixing or blending flour, the combination of a series of screw conveyers which receive the individual grades, kinds, or qualities of flour to be mixed or blended, a chute common to all of such screw conveyers, two vibrating sieves arranged one within the other, and moving in opposition, a series of foraminous or reticulated agitators arranged beneath the sieves, a pair of such agitators being arranged immediately below the sieves and turning toward one another, and adapted to be driven at a high speed to aerate the flour and a discharge screw conveyer, substantially as described.

4. In a machine for mixing or blending flour, the combination of a series of feeding devices, which receive the individual grades, kinds or qualities of flour to be mixed or blended, a chute into which all of such feeding devices discharge, two sieves arranged one within the other, and means to vibrate them in opposition, a series of open-work, cylindrical rotary agitators arranged beneath the sieves, two of such agitators being arranged in the same plane and immediately beneath the sieves and turning in opposite directions, and the third being arranged below the two and in the plane of their closest approach, the several agitators serving to mix and enliven or aerate the flour and a discharging device below the third agitator, substantially as described.

In testimony whereof I have hereunto set my hand this 5th day of December, A. D. 1895.

BENJAMIN M. ROOT.

Witnesses:
JAMES R. WILEY,
JACOB E. WEAVER.